United States Patent Office  3,462,517
Patented Aug. 19, 1969

3,462,517
STABILIZED POLYMERIC COMPOSITION
Ralph H. Hansen, Millburn, and Charles A. Russell, Fair Haven, N.J., assignors to Bell Telephone Laboratories, Incorporated, New York, N.Y., a corporation of New York
No Drawing. Continuation of application Ser. No. 349,784, Oct. 1, 1963, now abandoned, which is a division of application Ser. No. 77,012, Dec. 20, 1960. This application May 1, 1967, Ser. No. 635,271
Int. Cl. C08f *45/60, 29/18*
U.S. Cl. 260—897                        5 Claims

ABSTRACT OF THE DISCLOSURE

The specification describes stabilizers for polymers, particularly polypropylene, that are subject to copper-catalyzed oxidation. The adverse effects due to the presence of copper in the polymer are reduced by adding to the polymer a small amount of oxamide or a derivative thereof. Standard antioxidants are included also.

---

This is a continuation of application Ser. No. 349,784, filed Oct. 1, 1963, which is a division of application Ser. No. 77,012, filed Dec. 20, 1960 by Ralph H. Hansen and Charles A. Russell, both now abandoned, and relates to stabilized polymeric compositions. Further, it concerns the stabilization of polypropylene and higher order polymerized saturated hydrocarbon alkenes against oxidative degradation.

Much attention has recently been directed to the stabilization of polyethylene. It now appears that various of the higher order saturated hydrocarbon polymers are better adapted for certain uses. Specifically, polypropylene appears to be particularly promising for expanded wire insulation. It is tough, hard, sufficiently flexible, resistant to thermal embrittlement and stress cracking, high melting and quite insoluble in many ordinary solvents. However, accompanying these advantages are various factors hindering the use of these materials, notably their propensity toward thermal oxidation. These higher order polymers are easily oxidized due to the relatively high proportion of tertiary carbon atoms they contain in comparison with the almost linear materials such as the high density polyethylenes. Further, thermal oxidation of these higher order polymers is catalyzed by metal ions. In view of this propensity toward thermal oxidation and the susceptibility to metal ion catalysis, the problem of oxidative degradation has been found to be severe in these higher order polymers. Specifically, it has been found that the useful life of polypropylene, even when stabilized with the best known antioxidant materials, becomes commercially prohibitive for many applications when used in contact with copper. As primary electrical insulation for copper wires and cables, for instance, polypropylene becomes useless after a very few months. Accordingly, this invention is directed to the stabilization against thermal oxidative degradation accelerated by the presence of copper ions.

This invention proposes a new stabilized composition effective against oxidative degradation promoted or accelerated by contact with copper ions. Higher order polymers, stabilized with the novel components of this invention, show a high degree of stability both in contact and out of contact with copper. The constituents of the stabilized system according to this invention includes a higher order polymer, for instance, polypropylene, an inhibitor against copper catalyzed oxidative breakdown and an antioxidant.

The polymers intended to be within the scope of this invention are polypropylene and higher order polymers. The term higher order polymers refers to polymers of more complex hydrocarbons, i.e., those having more than three carbon atoms. Some specific compounds appropriate for this invention are polypropylene, polybutene-1, poly-3-methyl butene-1, poly-4-methyl pentene-1, poly-4,4'-dimethyl pentene-1, polydodecene-1, and poly-3-methyl pentene-1. Mixture of these compounds and copolymers thereof are also intended to be included as part of the polymeric class adapted to be stabilized by the composition of this invention. For the purposes here a mixture is considered to be within the scope of this invention as long as the predominant portion of its composition is a polymer of the character as herein defined.

It is also intended that this invention encompass polymeric compositions containing minor proportions of additional ingredients such as fillers, coloring agents, inhibitors against ultraviolet degradation such as carbon black, etc. Of particular concern in this connection are compounds capable of expanding the polymer. As was stated previously, expanded polypropylene, if properly protected agianst copper poisoning with the inhibitor of this invention, is an excellent electrical insulation material. Expanded polymers serve other well known uses and are attractive because of their reduced cost. The stabilizing composition according to this invention is fully compatible with known commercial blowing agents and will not interfere with their blowing action.

The novel inhibitors against copper ion catalyzed oxidative degradation according to the primary feature of this invention are certain compounds derived generally from oxamide which contain the radical

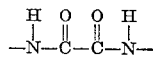

It has been found that certain of these compounds possessing at least this basic structure provide good inhibiting effects in the polymers previously defined. The specific compounds intended to be within the scope of this invention are defined as follows:

Oxamide; polymers and copolymers of oxamide and derivatives thereof; derivatives of oxamide having the general formula;

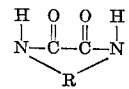

where R is either an ethylene or a keto group; and derivatives of oxamide having the general formula:

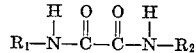

where $R_1$ and $R_2$ are cyclic radicals. $R_1$ and $R_2$ may be the same or different. They may be homocyclic, heterocyclic, aromatic or polycyclic and may have 4–6 carbon atoms in each cyclic ring.

In each of the latter two cases, R, $R_1$ and $R_2$ may be substituted in any manner as desired. The compounds falling within the scope of this invention are any which contain these basic structures as set forth above.

The following examples are offered to show that compounds having the structure defined above will be effective inhibitors when used according to the prescribed teachings of this invention. Each example gives a particular polymeric composition including the inhibitor of the class defined and additionally including a particular well known stabilizer against thermal oxidation. Each example gives the results of an accelerated oxidation test whereby the effective useful life of the polymer is measured. In every case the time in hours is that period during which the polymer retains its useful properties. According to this accelerated test procedure, it has been found that the point at which the polymer has effectively failed is that where the polymer has absorbed oxygen in the amount of 10 cc./gram of sample. Accordingly, each result reported is considered a measure of the failure point of the particular composition listed. As will be seen the group of materials tested as inhibitors represents a reasonable cross-section of the compounds falling within the general class of oxamide and the derivatives defined above.

The accelerated aging tests were conducted substantially as follows:

Samples of the polymer containing the additives as indicated in each example were prepared in a Brabender Plastograph. The Brabender was heated to 205–210° C. A charge of 30 grams of resin was placed in the chamber and warmed for 3 minutes under a nitrogen atmosphere. The additives as desired were then added in amounts of .5% antioxidant and inhibitor and 1.4% copper in the form of copper dust. This mixture was then mixed for seven minutes.

The copper dust used was prepared as follows:

Purified electrolytic grade copper was heated to a bright red color in the reducing flame of a bunsen burner. While still bright red, the copper was quickly plunged into a beaker containing absolute alcohol. The alcohol was decanted and the copper dust was dried in a vacuum oven for a minimum of 2 hours at 60° C. The freshly-reduced copper was removed from the oven and the resultant clumps were broken up and added to the polymer where desired.

The batch was then removed from the chamber, pressed flat to about 100 mils, and a portion molded in a polished aluminum picture frame mold to a thickness of 10 mils. Molding was accomplished at a temperature of about 175–180° C. and a pressure of between 1200 and 2000 p.s.i. The sample was kept at this temperature and pressure for 1 minute and then the mold was transferred to a cold press for cooling under pressure.

The extruded samples reported were prepared from a polypropylene composition containing about 10% of polyisobutylene and 0.5%.

4,4' - thiobis-(3-methyl-6-tert.-butyl-phenol). Granules of the polymer were shaken with 0.5% of the desired inhibitor. The mixture was then extruded on a production-size extruder. This resulted in about 8–10 mils of expanded insulation (40–50% voids) on 19 gauge copper wire.

Accelerated thermal oxidation tests, in which the amount of oxygen reacting at atmospheric pressure with the sample in a closed system was measured volumetrically, were carried out at a temperature of 140° C. The reaction vessels consisted of Corning No. 459,050 oxygen uptake pipets. Approximately 30 inches of transparent plastic tubing, used as a leveling tube, was attached, and the appropriate amount of mercury was added by filling through the plastic tubing. The tubing was clamped to restrict the flow of mercury and an inner tube, which contained the sample and enough Linde Type 5–A Molecular sieve (a zeolite resin) to absorb the $CO_2$ and $H_2O$ evolved during oxidation, was added. The sample was comprised of strips of 10-mil molded film or expanded wire insulation, wire and all (about 8–10 mils of about 55% plastic content on 19 gauge wire).

In both cases, the weight of the plastic sample used was 0.1 gram. The pipet was then sealed under a steady flow of oxygen after first alternately evacuating and flushing with oxygen several times. The sealed pipet was then placed into a constant temperature bath maintained at the desired temperature and an initial volume reading was taken after about 15 minutes. The rate of reaction was followed by observing changes in the level of mercury in the sample pipet as compared with a control pipet (prepared in the same way except that it did not contain the polymer sample).

It has been noted that the physical properties (as evidenced by brittleness, lack of elongation, etc.) of polypropylene specimens deteriorated markedly after an oxygen uptake of 10 cc. per gram of polymer. Accordingly, time for failure of a test specimen is reported as the time when thermal oxidation has proceeded to this extent.

The results of the accelerated aging tests on various compositions including oxamide type inhibitors are contained in the following table. The polymer in Examples 1–16 was polypropylene. Examples 17–20 directed to the use of poly(butene-1) are included to show the adaptability of this invention to higher order polymers. In Examples 21–23 the polymer was polypropylene expanded with a known commercial blowing agent, azodicarbonamide and additionally including approximately 10% of polyisobutylene. These latter examples show the effectiveness of the stabilizer compositions of this invention in polymer mixtures which contain a predominant portion of polypropylene or higher order polymers.

In each example listed the second through fifth columns define the composition tested by the procedure outlined above. The last column sets forth the effective period of inhibition at 140° C. as discussed previously. The significance of these periods in terms of predictable effective life in actual anticipated use will be treated hereinafter.

TABLE I

| Example | Polymer | Metal Ion Added | .5% Thermal Antioxidant | .5% Inhibitor | Useful Life on Accelerated Basis (Hours) |
|---|---|---|---|---|---|
| 1 | Polypropylene | None | None | None | 1.2 |
| 2 | do | do | 4,4'-thiobis-(3-methyl-6-tert.butyl phenol) | do | 440 |
| 3 | do | Cu | do | do | 43 |
| 4 | do | Cu | do | Oxamide | 78 |
| 5 | do | Cu | do | Poly-(1,6-diaminohexane)-oximide | 105 |
| 6 | do | Cu | do | Poly-[1,4-bis(aminomethyl), cyclohexyl] oximide | 141 |
| 7 | do | Cu | do | Poly-(3,3'-diaminodipropylamine) oximide | 80 |
| 8 | do | Cu | do | Poly-[0.75 1,4-bis(aminomethyl)cyclohexyl—0.25 1,6-di hexane] oximide | 107 |
| 9 | do | Cu | do | Ethylene oxamide | 110 |
| 10 | do | Cu | do | Oxalyl urea | 60 |
| 11 | do | Cu | do | N,N'-dibenzyl oxamide | 56 |
| 12 | do | Cu | do | N,N'-diphenyl oxamide | 135 |
| 13 | do | Cu | do | N,N'-bis-(o-chlorophenyl) oxamide | 76 |
| 14 | do | Cu | do | N,N'-bis-(p-tolyl) oxamide | 96 |
| 15 | do | Cu | do | N,N'-bis-(ethoxyphenyl) oxamide | 73 |
| 16 | do | Cu | do | N,N'-bis-(2-pyridyl) oxamide | 95 |
| 17 | Poly(butene-1) | None | None | None | 1.0 |
| 18 | do | do | 4,4'-thiobis-(3-methyl-6-tert.butyl phenol) | do | 350 |
| 19 | do | Cu | do | do | 170 |
| 20 | do | Cu | do | N,N'-diphenyl oxamide | 250 |
| 21* | Polypropylene | Cu | do | Oxamide | 82 |
| 22* | do | Cu | do | N,N'-diphenyl oxamide | 130 |
| 23* | do | Cu | do | None | 43 |

*Polymer expanded with 0.5% azodicarbonamide and includes 10% polyisobutylene.

Examples 1 (polypropylene) and 17 (poly(butene-1)) show the effective life of the pure virgin uninhibited polymer. Examples 2 and 18 show the increase in effective life of the polymer (on accelerated basis) after stabilization with .5% of 4,4'-thiobis-(3-methyl-6-tert.-butyl-phenol), a typical known commercial antioxidant. All percentage compositions used here and elsewhere in this specification are percentage compostion by weight. Examples 3 and 19 indicate the drastic reduction of the effective life of the polymer stabilized with an ordinary antioxidant when placed in contact with copper. However, Examples 4–16 (polypropylene) and 20 (poly(butene-1)) illustrate the increased stabilization exhibited by polymers which already include a commercial antioxidant (4,4'-thiobis-(3-methyl-6-tert.-butyl-phenol) through the addition of .5% of an inhibitor of this invention containing the oxamide radical. It is readily apparent from an examination of the effective periods indicated in Table I that polymers containing the mixture of this invention provide far superior stability against thermal oxidation in the presence of copper than can be obtained through the use of commercial antioxidants alone. Examples 21–23 are directed to an expanded polymer extruded by known techniques onto 19 gauge copper wire and intended for use as primary electrical insulation. The thickness of the polymer insulation was in each case about 0.010" and the expansion was accomplished by the use of 0.5% azodicarbonamide and initiated at approximately 200° C. The polymers in Examples 21–23 additionally included 10% poly-(isobutylene) to improve strength and to reduce low temperature brittleness. These examples are included to show that the stabilizing mixture of this invention is applicable to mixtures of polymers and does not interfere with commercial blowing agents used in expanding the polymer. As stated previously the stabilizers of this invention are of particular interest for use in expanded polymeric primary electrical insulation over copper wire which requires that the blowing or expanding agents and the stabilizing agents be compatible.

To illustrate that the stabilizing mixture of this invention is effective regardless of the particular commercial antioxidant chosen, a series of examples are presented in Table II. Example 24 is included as a control showing pure uninhibited polypropylene. The experimental procedure was identical to that used in the previous examples. The headings on the columns of data appearing in Table II are the same as those column headings appearing in Table I. In each of Examples 25, 28, 31, 34, 37 and 40, a different commercial antioxidant was added to the pure polymer and the degree of effectiveness was measured and recorded in the last column of Table II. In Examples 26, 29, 32, 35, 38 and 41, copper dust was added to the otherwise stabilized polymer and the reduction in effective life was noted. In Examples 27, 30, 33, 36, 39 and 42 a typical inhibitor according to the principal teachings of this invention was added and the effective life again measured. The data obtained is as follows:

TABLE II

| Example | Polymer | Metal Ion Added | .5% Thermal Antioxidant | .5% Inhibitor | Useful Life on Accelerated Basis (hours) |
|---|---|---|---|---|---|
| 24 | Polypropylene | None | None | None | 1.2 |
| 25 | do | do | 2,6-di-tert.butyl-4-methyl phenol | do | 30 |
| 26 | do | Cu | do | do | 6.5 |
| 27 | do | Cu | do | N,N'-diphenyl oxamide | 12 |
| 28 | do | None | Phenyl-β-naphthylamine | None | 372 |
| 29 | do | Cu | do | do | 52 |
| 30 | do | Cu | do | N,N'-diphenyl oxamide | 112 |
| 31 | do | None | 5-N-pentadecyl resorcinol | None | 164 |
| 32 | do | Cu | do | do | 14 |
| 33 | do | Cu | do | N,N'-diphenyl oxamide | 80 |
| 34 | do | None | 6,6'-di-tert.-butyl-4,'-di-o-cresol | do | 106 |
| 35 | do | Cu | do | do | 14 |
| 36 | do | Cu | do | do | 100 |
| 37 | do | None | .5% 4,4'-thiobis-(3-methyl-6-tert.butyl phenol)— .5% poly-trimethyl dihydroquinoline. | None | 423 |
| 38 | do | Cu | do | do | 185 |
| 39 | do | Cu | do | N,N'-diphenyl oxamide | 292 |
| 40 | do | None | 4-4'-butylidenebis-(6-tert.-butyl-3-methyl phenol). | None | 77 |
| 41 | do | Cu | do | do | 9 |
| 42 | do | Cu | do | N,N'-diphenyl oxamide | 47 |

It is readily apparent that in the case of each of the five known commercial antioxidant materials tested, the effective life of the polymer when in contact with copper was significantly increased by the addition of an oxamide type compound of the class defined previously. Thus it is seen that the oxamide type inhibitors of this invention are effective when used in conjunction or combination with any known effective antioxidant material.

The amount of the inhibitor added maintains its effectiveness as long as it does not significantly depart from the range of .1% to 5%. In decreasing the amount below .1%, the inhibitor is found to lose effectiveness. Amounts over 5% have been found to be effective but no advantage is obtained through the use of larger amounts. Consequently, it is economically unfeasible to include the inhibitors in amounts greater than 5%. The amount of antioxidant required is dependent in part on the degree of effectiveness provided by various percentages of different antioxidants and, of course, the degree of effectiveness desired. Amounts in the range of .05% to 5% are generally recommended for any of the commonly known antioxidant materials.

The significance of the accelerated aging studies in terms of effective useful life under actual service conditions are found by extrapolating the effective period in hours obtained at 140° C. as set forth in the tables to the expected life at the temperature designated for service use through an Arrhenious plot obtained at at least 2 other temperatures. This method of interpreting accelerated test data is well known in the art and is necessary to prescribe or predict service performance in various desired uses. The extrapolated data for a typical stabilized polymer of this invention indicates that an effective period of stabilization in accelerated tests of 75 hours at 140° C. will provide an effective stabilization period at 70° C. of 30 years.

Variations and modifications of the stabilizing composition of this invention will become apparent to those skilled in the art. However, all such departures from this specification as are properly considered within the skill of the art and also within the basic concepts of the advance provided to the art by this invention, are to be also properly considered within the scope of this invention as defined by this specification and the appended claims.

What is claimed is:

1. A polymer composition comprising: polypropylene stabilized against oxidation with a stabilizing amount of a thermal antioxidant, a contaminating amount of copper ions tending to promote oxidation even in the presence of the said thermal antioxidant, and a copper inhibitor in an amount of approximately 0.1 percent to 5 percent of the total composition for reducing the adverse effects of the copper ions present, the copper inhibitor selected from the group consisting of compounds having the general formula:

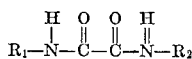

where $R_1$ and $R_2$ are cyclic radicals, compounds having the general formula:

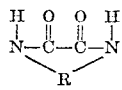

where R is an ethylene or keto radical, and polymers of monomers containing the radical:

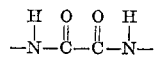

2. The composition of claim 1 wherein the thermal antioxidant is selected from the group consisting of: 4,4'-thiobis(3-methyl-6-tert. butyl phenol), 2,6-di-tert. butyl-4-methyl phenol, phenyl-β-naphthylamine, 5-N-pentadecyl resorcinol, 6,6'-di-tert. butyl-4,4'-di-O-cresol, 4,4'-thiobis-(3-methyl-6-tert. butyl phenol), poly-trimethyl dihydroquinoline, 4,4'-butylidenebis-(6-tert. butyl-3-methyl phenol).

3. The composition of claim 1 in which the copper inhibitor is a compound having the general formula:

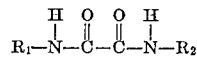

where $R_1$ and $R_2$ are benzyl or phenyl groups.

4. The composition of claim 1 in which the antioxidant is 4,4'-thiobis-(3-methyl-6-tert. butyl phenol).

5. The composition of claim 1 in which the polymer contains 10 percent poly-(isobutylene) and 90 percent polypropylene.

References Cited
UNITED STATES PATENTS

| | | | |
|---|---|---|---|
| 2,683,132 | 7/1954 | Young et al. | 260—45.9 |
| 2,857,424 | 10/1958 | Cox | 260—45.9 |
| 2,993,028 | 7/1961 | Randalli | 260—897 |
| 2,997,455 | 8/1961 | Broich et al. | 260—45.9 |
| 3,121,068 | 2/1964 | Baum | 260—897 |
| 2,945,838 | 7/1960 | Prober | 260—45.9 |
| 3,160,680 | 12/1964 | Tholstrup et al. | 260—897 |

SAMUEL H. BLECH, Primary Examiner

C. J. SECCURO, Assistant Examiner

U.S. Cl. X.R.

117—128.4; 260—2.5, 45.8, 45.9, 45.95, 857